US006418529B1

(12) United States Patent
Roussel

(10) Patent No.: US 6,418,529 B1
(45) Date of Patent: *Jul. 9, 2002

(54) APPARATUS AND METHOD FOR PERFORMING INTRA-ADD OPERATION

(75) Inventor: Patrice Roussel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/053,401

(22) Filed: Mar. 31, 1998

(51) Int. Cl.$^7$ .............................................. G06F 9/302
(52) U.S. Cl. ...................................... 712/221; 712/222
(58) Field of Search ......................... 712/42, 208, 221; 708/490

(56) References Cited

U.S. PATENT DOCUMENTS

| | | | |
|---|---|---|---|
| 3,711,692 A | 1/1973 | Batcher ...................... 708/210 |
| 3,723,715 A | 3/1973 | Chen et al. .................. 708/709 |
| 4,161,784 A | 7/1979 | Cushing et al. ............. 708/513 |
| 4,189,716 A | 2/1980 | Krambeck ................... 341/63 |
| 4,393,468 A | 7/1983 | New .......................... 708/518 |
| 4,418,383 A | 11/1983 | Doyle et al. ................ 710/127 |
| 4,498,177 A | 2/1985 | Larson ....................... 714/806 |
| 4,630,192 A | 12/1986 | Wassel et al. ............... 712/221 |
| 4,707,800 A | 11/1987 | Montrone et al. .......... 708/714 |
| 4,771,379 A | 9/1988 | Ando et al. .................... 712/42 |
| 4,785,393 A | 11/1988 | Chu et al. .................... 712/221 |
| 4,785,421 A | 11/1988 | Takahashi et al. .......... 708/205 |
| 4,901,270 A | 2/1990 | Galbi et al. ................. 708/708 |
| 4,989,168 A | 1/1991 | Kuroda et al. .............. 708/210 |
| 5,095,457 A | 3/1992 | Jeong ......................... 708/626 |
| 5,187,679 A | 2/1993 | Vassiliadis et al. ......... 708/706 |
| 5,201,056 A | 4/1993 | Daniel et al. ................. 712/41 |
| 5,327,369 A | 7/1994 | Ashkenazi |
| 5,339,447 A | 8/1994 | Balmer ........................ 377/82 |
| 5,390,135 A | 2/1995 | Lee et al. |
| 5,418,736 A | 5/1995 | Widigen et al. ............. 708/706 |
| 5,442,799 A | 8/1995 | Murakami et al. ............ 712/36 |
| 5,448,703 A | 9/1995 | Amini et al. ................ 710/110 |
| 5,517,626 A | 5/1996 | Archer et al. ................. 710/11 |
| 5,530,661 A | 6/1996 | Garbe et al. ................ 708/420 |
| 5,537,601 A | 7/1996 | Kimura et al. ................ 712/35 |
| 5,586,070 A | 12/1996 | Purcell ....................... 708/620 |

(List continued on next page.)

FOREIGN PATENT DOCUMENTS

| | | |
|---|---|---|
| EP | 0 318 957 A3 | 11/1988 |
| WO | WO 97/23821 | 7/1997 |

OTHER PUBLICATIONS

MIPS Extension for Digital Media with 3D, MIPS Technology, Inc., Mar. 12, 1997, pp 0–26.
A Procesor Architecture for 3D Graphics Calculations, Yulun Wang, Amante Manager, Partha Srinivasan, Computer Motion, Inc., pp 1–23.
Parallel Computers for Graphics Applications (Proceedings: Second International Conference . . . ), Levinthal, et al., 1987, pp 193–198.

(List continued on next page.)

Primary Examiner—David Y. Eng
(74) Attorney, Agent, or Firm—Blakely, Sokoloff, Taylor & Zafman LLP

(57) ABSTRACT

Method and apparatus for including in a processor, instructions for performing intra-add operations on packed data. In one embodiment, an execution unit is coupled to a storage area. The storeage area has stored therein a first packed data operand and a second packed data operand. The execution unit performs operations on data elements in the first packed data operand and the second packed data operand to generate a plurality of data elements in a packed data result in response to receiving a single instruction. At least two of the plurality of data elements in a packed data result store the result of an intra-add operation using the first packed data operand and the second packed data operand.

58 Claims, 13 Drawing Sheets

INTRA-ADD: IRESULT1-IRESULT1; I RESULT2-IRESULT2

U.S. PATENT DOCUMENTS

| | | | |
|---|---|---|---|
| 5,677,862 A | 10/1997 | Peleg et al. | |
| 5,678,009 A | 10/1997 | Bains et al. | 710/125 |
| 5,721,697 A | 2/1998 | Lee | 708/620 |
| 5,721,892 A | 2/1998 | Peleg et al. | |
| 5,815,421 A | 9/1998 | Dulong et al. | |
| 5,819,117 A | 10/1998 | Hansen | |
| 5,822,232 A | 10/1998 | Dulong et al. | |
| 5,859,790 A * | 1/1999 | Sidwell | 708/607 |
| 5,862,067 A | 1/1999 | Mennemeier et al. | |
| 5,875,355 A * | 2/1999 | Mackenzie et al. | 708/607 |
| 5,880,984 A | 3/1999 | Burchfiel et al. | 708/501 |
| 5,880,985 A | 3/1999 | Makineni et al. | 708/625 |
| 5,883,824 A | 3/1999 | Lee et al. | |
| 5,887,186 A * | 3/1999 | Nakanishi | 712/28 |
| 5,901,301 A | 5/1999 | Matsuo et al. | 712/212 |
| 5,918,062 A * | 6/1999 | Oberman et al. | 395/800.07 |
| 5,983,257 A | 11/1999 | Dulong et al. | 708/203 |
| 6,006,316 A | 12/1999 | Dinkjian | |
| 6,014,684 A * | 1/2000 | Hoffman | 708/620 |
| 6,014,735 A | 1/2000 | Chennupaty et al. | |
| 6,041,404 A * | 3/2000 | Roussel et al. | 712/210 |
| 6,115,812 A | 9/2000 | Abdallah et al. | |
| 6,122,725 A | 9/2000 | Roussel et al. | |
| 6,211,892 B1 | 4/2001 | Huff et al. | |
| 6,212,618 B1 | 4/2001 | Roussel | |
| 6,230,253 B1 | 5/2001 | Roussel et al. | |
| 6,230,257 B1 | 5/2001 | Roussel et al. | |
| 6,288,723 B1 | 9/2001 | Huff et al. | |

OTHER PUBLICATIONS

A SIMD Graphics Processor, Adam Levinthal, Thomas Porter, 1984, pp 77–82.

Architecture of a Broadband Mediaprocessor (Proceedings of COMPCON '96), Craig Hansen, 1996, pp 334–354.

64–bit and Multimedia Extensions in the PA–RISC 2.0 Architecture, Computing Directory Technologies Precision Architecture Document, Jul. 17, 1997.

Silicon Graphics Introduces Enhanced MIPS Architecture to Lead the Interactive Digital Revolution, Oct. 21, 1996.

21164 Alpha Microprocessor Data Sheet, Samsung Electronics, 1997.

TM100–Preliminary Data Book, Philips Semiconductors, Jul. 1, 1997, pp A–74, A133–138, A161.

Visual Instruction Set (VIS) User's Guide, Sun Microsystems, Version 1.1, Mar. 1997, pp i–xii, 1–127.

AMD–3D Technology Manual, Advance Micro Devices, (AMD), Feb. 1998, pp i–x 1–58.

J. Shipnes, Graphics Processing with the 88110 RISC Microprocessor, IEEE (1992), pp. 169–174.

TMS320C2x User's Guide, Texas Instruments (1993) pp. 3–2 through 3–11; 3–28 through 3–34; 4–1 through 4–22; 4–41; 4–1–3 through 4–120; 4–122; 4–150 through 4–151.

SPARC Technology Business, UltraSPARC Multimedia Capabilities On–Chip Support for Real–Time Video and Advanced Graphics, Sun Microsystems (Sep. 1994).

IBM Technical Disclosure Bulletin, vol. 35, No. 1A, Bit Zone Accumulator, Jun. 1992, p. 106.

Intel i750, i860; i960 Processors and Related Products, 1993, pp 1–3.

MC88110 Programmer's Reference Guide, Motorola Inc. (1992), p 1–4.

MC88110 Second Generation RISC Microprocessor User's Manual, Motorola, Inc. (1991).

Errata to MC88110 Second Generation RISC Microporcessor User's Manual, Motorola, (Sep. 1992).

GWENNAP, New PA–RISC Processor Decodes MPEG Video, Microprocessor Report (Jan. 1994) pp. 16,17.

CASE, Philips Hopes to Displace DSPs with VLIW, Microprocessor Report (Dec. 1994), pp. 12–15.

J.F. Takie, et al., "Comparison of Some Parallel Matrix Multiplication Algorithms", 8th Mediterranean Electrotechnical Conference, Melecon '96, vol. 1, 1996, pp 155–158.

H. Barad, et al., "Intel's Multimedia Architecture Extension", Nineteenth Convention of Electrical and Electronics Engineers in Isreal, 1996, pp. 158–151.

U.S. Pat. Application No. 08/521,360, titled "A set of Instructions for Operating on a Packed Data", filed on Aug. 31, 1995, assigned to Intel Corporation, now abandoned.

* cited by examiner

MULTIPLY - SOURCE 1, SOURCE 2

INTRA-ADD: DATA ELEMENTS OF IRESULT2; IRESULT1

MULTIPLY: SOURCE1, SOURCE2

|   127      96 | 95      64 | 63      32 | 31      0 | |
|---|---|---|---|---|
| A24 | A23 | A22 | A21 | Source2 |

|   127      96 | 95      64 | 63      32 | 31      0 | |
|---|---|---|---|---|
| X4 | X3 | X2 | X1 | SourceX |

|   127      96 | 95      64 | 63      32 | 31      0 | |
|---|---|---|---|---|
| A24X4 | A23X3 | A22X2 | A21X1 | IResult2 |

FIGURE 4B

|   127      96 | 95      64 | 63      32 | 31      0 | |
|---|---|---|---|---|
| A34 | A33 | A32 | A31 | Source3 |

|   127      96 | 95      64 | 63      32 | 31      0 | |
|---|---|---|---|---|
| X4 | X3 | X2 | X1 | SourceX |

|   127      96 | 95      64 | 63      32 | 31      0 | |
|---|---|---|---|---|
| A34X4 | A33X3 | A32X2 | A31X1 | IResult3 |

FIGURE 4C

| 127 | 96 95 | 64 63 | 32 31 | 0 |
|---|---|---|---|---|
| $A_{44}$ | $A_{43}$ | $A_{42}$ | $A_{41}$ | Source4 |

| 127 | 96 95 | 64 63 | 32 31 | 0 |
|---|---|---|---|---|
| $X_4$ | $X_3$ | $X_2$ | $X_1$ | SourceX |

| 127 | 96 95 | 64 63 | 32 31 | 0 |
|---|---|---|---|---|
| $A_{44}X_4$ | $A_{43}X_3$ | $A_{42}X_2$ | $A_{41}X_1$ | IResult4 |

FIGURE 4D

INTRA-ADD: IRESULT1-IRESULT1; I RESULT2-IRESULT2

| 127 96 | 95 64 | 63 32 | 31 0 | |
|---|---|---|---|---|
| $A_{14}X_4$ | $A_{13}X_3$ | $A_{12}X_2$ | $A_{11}X_1$ | IResult1 |

| 127 96 | 95 64 | 63 32 | 31 0 | |
|---|---|---|---|---|
| $A_{24}X_4$ | $A_{23}X_3$ | $A_{22}X_2$ | $A_{21}X_1$ | IResult2 |

| 127 96 | 95 64 | 63 32 | 31 0 | |
|---|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ | |

IAResult1

FIGURE 4E

INTRA-ADD: IRESULT3-IRESULT3; I RESULT4-IRESULT4

| 127    96 | 95    64 | 63    32 | 31    0 | |
|-----------|----------|----------|---------|---|
| A34X4 | A33X3 | A32X2 | A31X1 | IResult3 |

| 127    96 | 95    64 | 63    32 | 31    0 | |
|-----------|----------|----------|---------|---|
| A44X4 | A43X3 | A42X2 | aA41X1 | IResult4 |

| 127    96 | 95    64 | 63    32 | 31    0 | |
|-----------|----------|----------|---------|---|
| A44X4+A43X3 | A42X2+A41X1 | A34X4+A33X3 | A32X2+A31X1 | |

IAResult2

FIGURE 4F

INTRA-ADD

| 127 96 | 95 64 | 63 32 | 31 0 |
|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ |

IAResult1

| 127 96 | 95 64 | 63 32 | 31 0 |
|---|---|---|---|
| $A_{44}X_4+A_{43}X_3$ | $A_{42}X_2+A_{41}X_1$ | $A_{34}X_4+A_{33}X_3$ | $A_{32}X_2+A_{31}X_1$ |

IAResult2

| 127 96 | 95 64 | 63 32 | 31 0 |
|---|---|---|---|
| $A_{44}X_4+A_{43}X_3+$<br>$A_{42}X_2+A_{41}X_1$ | $A_{34}X_4+A_{33}X_3+$<br>$A_{32}X_2+A_{31}X_1$ | $A_{24}X_4+A_{23}X_3+$<br>$A_{22}X_2+A_{21}X_1$ | $A_{14}X_4+A_{13}X_3+$<br>$A_{12}X_2+A_{11}X_1$ |

Result

FIGURE 4G

APPARATUS AND METHOD FOR PERFORMING INTRA-ADD OPERATION

CROSS REFERENCE TO RELATED APPLICATIONS

This application is related to U.S. patent application Ser. No. 09/053,388, entitled "APPARATUS AND METHOD FOR PERFORMING MULTI-DIMENSIONAL COMPUTATIONS BASED ON INTRA-ADD OPERATION", filed Mar. 31, 1998 by Patrice Roussel, now U.S. Pat. No. 6,212,618; and, this application is also related to U.S. patent application Ser. No. 09/053,389, entitled "SYSTEM AND METHOD FOR PERFORMING AN INTRA-ADD OPERATION", filed Mar. 31, 1998 by Thomas Huff and Shreekant Thakkar, now U.S. Pat. No. 6,211,892.

BACKGROUND OF THE INVENTION

1. Field of the Invention

The present invention relates in general to the field of computer systems, and in particular, to an apparatus and method for performing multi-dimensional computations based on an intra-add operation.

2. Description of the Related Art

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in significant performance improvement.

Currently, the SIMD addition operation only performs "vertical" or inter-register addition, where pairs of data elements, for example, a first element Xn (where n is an integer) from one operand, and a second element Yn from a second operand, are added together. An example of such a vertical addition operation is shown in FIG. 1, where the instruction is performed on the sets of data elements ($X_3$, $X_2$, $X_1$ and $X_0$) and ($Y_3$, $Y_2$, $Y_1$, and $Y_0$) accessed as Source1 and Source2, respectively to obtain the result ($X_3+Y_3$, $X_2+Y_2$, $X_1+Y_1$, and $X_0+Y_0$).

Although many applications currently in use can take advantage of such a vertical add operation, there are a number of important applications which would require the rearrangement of the data elements before the vertical add operation can be implemented so as to provide realization of the application.

For example, a matrix multiplication operation is shown below.

MATRIX $A *$ VECTOR $\chi =$ VECTOR Y $$\begin{vmatrix} A_{14} & A_{13} & A_{12} & A_{11} \\ A_{24} & A_{23} & A_{22} & A_{21} \\ A_{34} & A_{33} & A_{32} & A_{31} \\ A_{44} & A_{43} & A_{42} & A_{41} \end{vmatrix} \times \begin{vmatrix} \chi_4 \\ \chi_3 \\ \chi_2 \\ \chi_1 \end{vmatrix} = \begin{vmatrix} A_{14}\chi_4 + A_{13}\chi_3 + A_{12}\chi_2 + A_{11}\chi_1 \\ A_{24}\chi_4 + A_{23}\chi_3 + A_{22}\chi_2 + A_{21}\chi_1 \\ A_{34}\chi_4 + A_{33}\chi_3 + A_{32}\chi_2 + A_{31}\chi_1 \\ A_{44}\chi_4 + A_{43}\chi_3 + A_{42}\chi_2 + A_{41}\chi_1 \end{vmatrix}$$

To obtain the product of the matrix A with a vector X to obtain the resulting vector Y, instructions are used to: 1) store the columns of the matrix A as packed operands (this typically requires rearrangement of data because the rows of the matrix A coefficients are stored to be accessed as packed data operands, not the columns); 2) store a set of operands that each have a different one of the vector X coefficients in every data element; 3) use vertical multiplication where each data element in the vector X (i.e., $X_4$, $X_3$, $X_2$, $X_1$) has to be first multiplied with data elements in each column (for example, [$A_{14}$, $A_{24}$, $A_{34}$, $A_{44}$]) of the matrix A. The results of the multiplication operations are then added together through three vertical add operations such as that shown in FIG. 1, to obtain the final result. Such a matrix multiplication operation based on the use of vertical add operations typically requires 20 instructions to implement, an example of which is shown below in Table 1.

Exemplary Code Based on Vertical-Add Operations

Assumptions:

1/X stored with X1 first, X4 last

2/transposed of A stored with A11 first, A21 second, A31 third, etc.

3/availability of:
  DUPLS: duplicate once
  DUPLD: duplicate twice

TABLE 1

| | | | |
|---|---|---|---|
| MOVD | mm0, <mem_X> | // [0, 0, 0, X1] | |
| DUPLS | mm0, mm0 | // [0, 0, X1, X1] | |
| DUPLD | mm0, mm0 | // [X1, X1, X1, X1] | |
| PFMUL | mm0, <mem_A> | // [A41*X1, A31*X1, A21*X1, A11*X1] | |
| MOVD | mm1, <mem_X + 4> | // [0, 0, 0, X2] | |
| DUPLS | mm1, mm1 | // [0, 0, X2, X2] | |
| DUPLD | mm1, mm1 | // [X2, X2, X2, X2] | |
| PFMUL | mm1, <mem_A + 16> | // [A42*X2, A32*X2, A22*X2, A12*X2] | |
| MOVD | mm2, <mem_X + 8> | // [0, 0, 0, X3] | |
| DUPLS | mm2, mm2 | // [0, 0, X3, X3] | |
| DUPLD | mm2, mm2 | // [X3, X3, X3, X3] | |
| PFMUL | mm2, <mem_A + 32> | // [A43*X3, A33*X3, A23*X3, A13*X3] | |
| MOVD | mm3, <mem_X + 12> | // [0, 0, 0, X4] | |
| DUPLS | mm3, mm3 | // [0, 0, X4, X4] | |
| DUPLD | mm3, mm3 | // [X4, X4, X4, X4] | |
| PFMUL | mm3, <mem_A + 48> | // [A44*X4, A34*X4, A24*X4, A14*X4] | |
| PFADD | mm0, mm1 | // [A42*X2 + A41*X1, A32*X2 + A31*X1, | |
| | | // A22*X2 + A21*X1, A12*X2 + A11*X1] | |
| PFADD | mm2, mm3 | // [A44*X4 + A43*X3, A34*X4 + A33*X3, | |
| | | // A24*X4 + A23*X3, A14*X4 + A13*X3] | |

TABLE 1-continued

| | | |
|---|---|---|
| PFADD | mm0, mm2 | // [A44*X4 + A43*X3 + A42*X2 + A41*X1, |
| | | // A34*X4 + A33*X3 + A32*X2 + A31*X1, |
| | | // A24*X4 + A23*X3 + A22*X2 + A21*X1, |
| | | // A14*X4 + A13*X3 + A12*X2 + A11*X1] |
| MOVDQ | <mem_Y>, mm0 | // store [Y4, Y3, Y2, Y1] |

Accordingly, there is a need in the technology for providing an apparatus and method which efficiently performs multi-dimensional computations based on a "horizontal"or intra-add operation. There is also a need in the technology for a method and operation for increasing code density by eliminating the need for the rearrangement of data elements and the corresponding rearrangement operations.

BRIEF SUMMARY OF THE INVENTION

A method and apparatus for including in a processor instructions for performing intra-add operations on packed data is described. In one embodiment, an execution unit is coupled to a storage area. The storage area has stored therein a first and a second packed data operands. The execution unit performs operations on data elements in the first and the second packed data operands to generate a plurality of data elements in a packed data result in response to receiving a single instruction. At least two of the plurality of data elements in the packed data result store the result of an intra-add operation upon the first and the second packed data operands.

BRIEF DESCRIPTION OF THE DRAWINGS

The invention is illustrated by way of example, and not limitation, in the figures. Like reference indicate similar elements.

FIG. 4A–4G illustrate matrix multiplication based on horizontal or intra-add operations in accordance with another embodiment of the present invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

OVERVIEW

Figure 1:
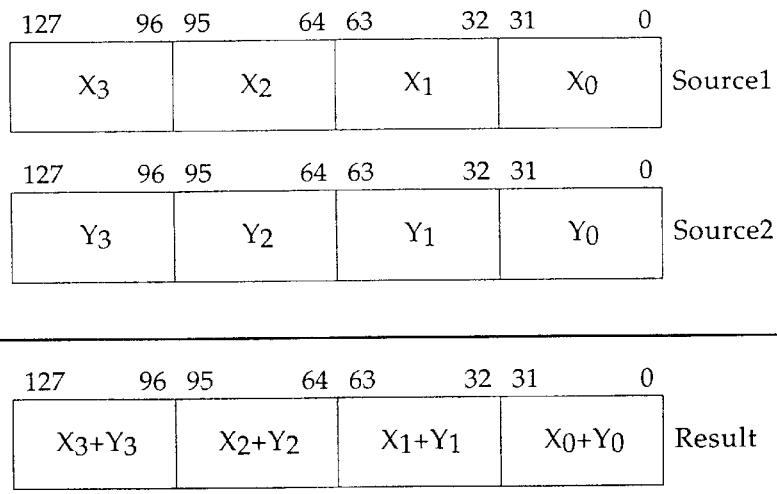
FIG. 1 illustrates the vertical or inter-add operation of the prior art.
Figure 2:
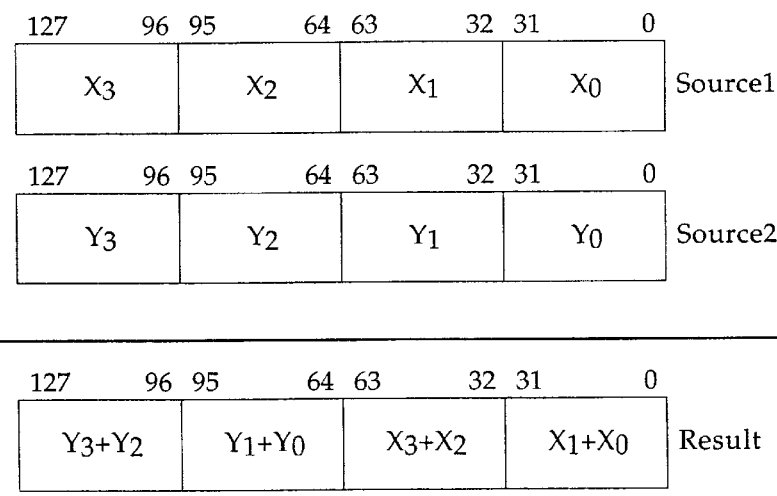
FIG. 2 illustrates the horizontal or intra-add operation in accordance with one embodiment of the present invention.

One aspect of the present invention is a processor including instructions for performing horizontal or intra-addition operations on packed data. The horizontal add or intra-add operation adds together pairs of data elements in a packed data operand. In one embodiment, two pairs of data elements (e.g., $X_3$ and $X_2$, and $X_1$ and $X_0$) located within a single storage area (e.g., Source1) are added together using a horizontal or a intra-add operation. In an alternate embodiment, data elements from each of two storage areas (e.g., Source1 and Source2) are added and stored as data elements of a resulting packed data, as shown in FIG. 2.

Figure 3A:
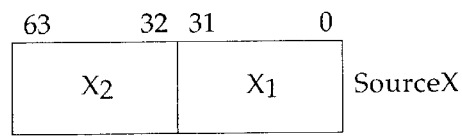
FIG. 3A–3C illustrate matrix multiplication based on horizontal or intra-add operations in accordance with one embodiment of the present invention.
Figure 3A:
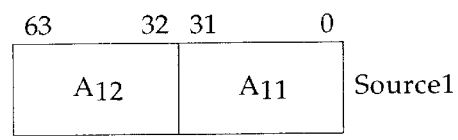
Figure 3A:
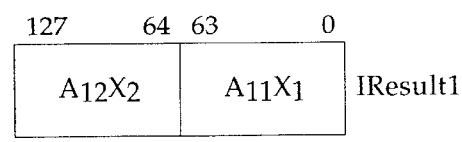
Figure 3B:
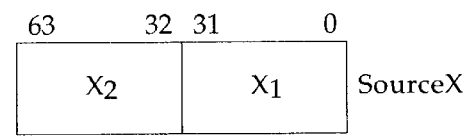
Figure 3B:
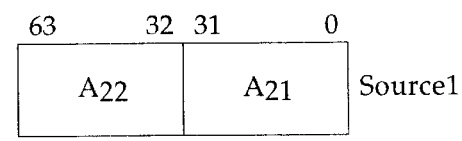
Figure 3B:
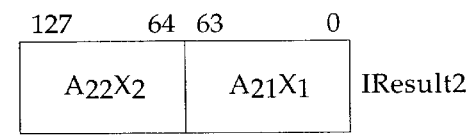
Figure 3C:
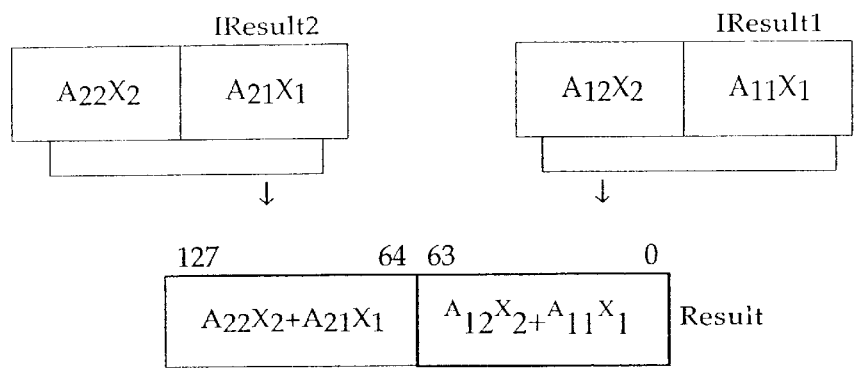
Figure 4A:
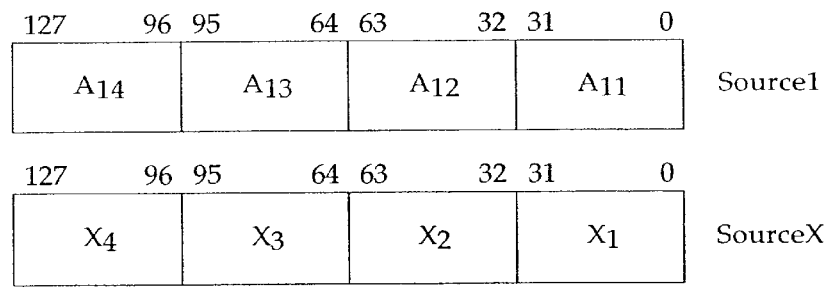
Figure 4A:
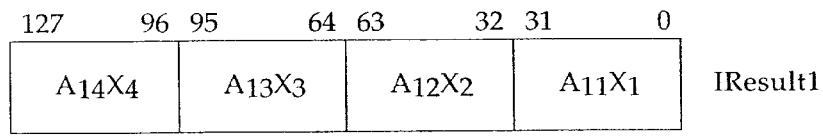

Another aspect of the present invention involves a method and apparatus for performing matrix multiplication using a horizontal or intra-addition operation. In one embodiment, each 32-bit data element from a 1×2 vector is multiplied with corresponding 32-bit data elements from each row of a 2×2 matrix, as shown in FIGS. 3A and 3B, generating two pairs of 64-bit intermediate results, each pair of which are stored in separate storage areas. An intra-add operation is performed on each pair of the intermediate results to generate a pair of data elements, which are stored as a packed result, as shown in FIG. 3C. The example on FIGS. 3A–3C illustrate the application of one embodiment of the present invention using an integer data format in which the full width of the result is stored in a result register. In alternative embodiments, the result register is the same size as the source register.

The operation of a further example of a matrix multiplication operation based on intra-add operations is shown in FIGS. 4A through 4G, and is representative of a multiplication operation between a 4×4 matrix and a 4×1 vector (such as the multiplication of a 4×4 matrix A with a 4×1 vector X to provide a 4×1 vector Y as described earlier). In particular, each data element from a 4×1 vector is multiplied with the corresponding data elements from each row of a 4×4 matrix, as shown in FIGS. 4A through 4D.

A first pair of intra-add operations are then performed on the initial resulting data elements (IResult1+IResult2, IResult3+IResult4), as shown in FIG. 4E and 4F; followed by a second single intra-add operation on the results of the first intra-add operations (IAResult1+IAResult2), to obtain the final result (Result) as shown in FIG. 4G.

Although the examples illustrated in FIGS. 4A–4G are floating point examples, the present invention may also be applied to packed integer data. Matrix multiplication based on horizontal add or intra-add operations only requires 12 instructions, as compared to the typical 20 instructions required when the same matrix multiplication is performed using vertical add or inter-add operations. Exemplary code for implementing matrix multiplication based on horizontal add or intra-add operations is shown in Table 2:

Exemplary Code Based on Horizontal-Add Operations

PFADDM represents the Intra-add instruction of the present invention.
Assumptions:

TABLE 2

```
1/X stored with X1 first, X2 second, . . . , X4 last
2/A stored with A11 first, A12 second, A13 third, etc.
MOVDQ     mm0, <mem_X>          // [X4, X3, X2, X1]
MOVDQ     mm3, mm0
  PFMUL     mm0, <mem_A>        // [A14*X4, A13*X3, A12*X2, A11*X1]
MOVDQ     mm1, mm3
  PFMUL     mm1, <mem_A + 16>   // [A24*X4, A23*X3, A22*X2, A21*X1]
MOVDQ     mm2, mm3
  PFMUL     mm2, <mem_A + 32>   // [A34*X4, A33*X3, A32*X2, A31*X1]
  PFMUL     mm3, <mem_A + 48>   // [A44*X4, A43*X3, A42*X2, A41*X1]
PFADDM    mm0, mm1              // [A24*X4 + A23*X3, A22*X2 + A21*X1,
                                // A14*X4 + A13*X3, A12*X2 + A11*X1]
PFADDM    mm2, mm3              // [A44*X4 + A43*X3, A42*X2 + A41*X1,
                                // A34*X4 + A33*X3, A32*X2 + A31*X1]
PFADDM    mm0, mm2              // [A44*X4 + A43*X3 + A42*X2 + A41*X1,
                                // A34*X4 + A33*X3 + A32*X2 + A31*X1],
                                // A24*X4 + A23*X3 + A22*X2 + A21*X1,
                                // A14*X4 + A13*X3 + A12*X2 + A11*X1]
MOVDQ     <mem_Y>, mm0          // store [Y4, Y3, Y2, Y1]
```

Although the discussions above pertain to a horizontal-add or intra-add instruction, alternative embodiments could in addition to, or in place of the intra-add instruction, have an intra-substract instruction or element operation. In this case, one of a pair of data elements within a packed data will be subtracted from a second element of the pair of data elements to accomplish the intra-subtract operations.

In addition, although the discussions above pertain to packed operands that have four data elements, alternative embodiments may involve packed operands that have at least two data elements (i.e., that are double wide).

COMPUTER SYSTEM

Figure 5:
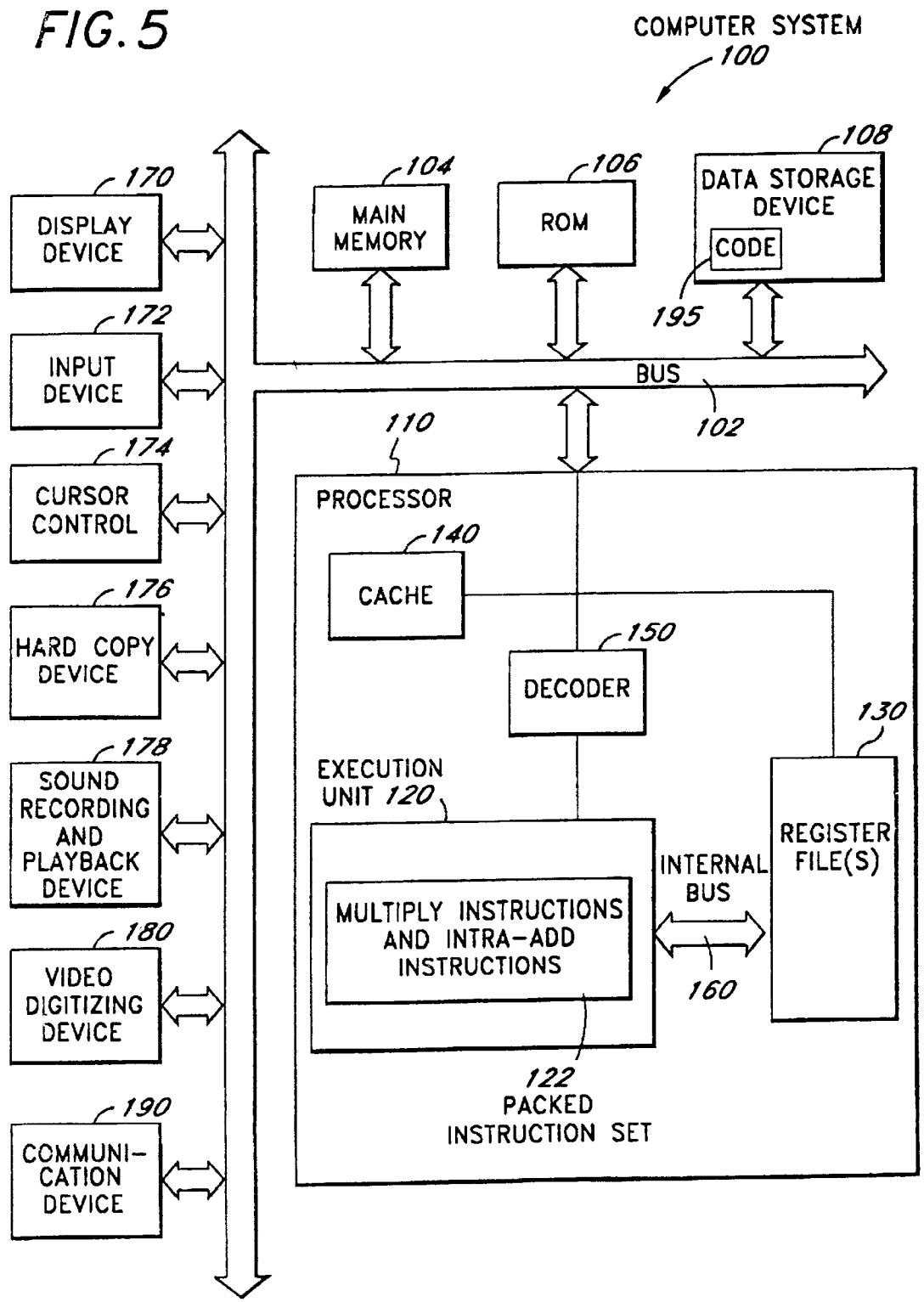
FIG. 5 illustrates an exemplary computer system in accordance with one embodiment of the invention.

FIG. 5 illustrates one embodiment of a computer system 100 which implements the principles of the present invention. Computer system 100 comprises a bus 102 for communicating information, and a processor 110 for processing information. In one embodiment, the bus 102 may be any communications hardware and/or software for communicating information. The processor 110 represents a central processing unit of any type of architecture, examples of which include a CISC, a RISC or a VLIW type architecture. Computer system 100 further comprises a main memory 104 that is coupled to bus 102, for storing information and instructions to be executed by the processor 110. Computer system 110 also comprises a read only memory (ROM) 106 and/or other status storage device, coupled to the bus 102 for storing information and instructions for access and execution by processor 110. In addition, computer system 110 comprises a data storage device 108 that is coupled to the bus 102 for storing information and instructions.

As shown in FIG. 5, processor 110 comprises an execution unit 120, a set of register file(s) 130, a cache memory 140, a decoder 150 and an internal bus 160. The processor 110 also includes additional circuitry (not shown) which is not necessary to the understanding of the present invention.

Execution unit 120 is used for executing instructions received by processor 110. In addition to recognizing instructions typically implemented in general purpose processors, execution unit 120 recognizes instructions in packed instruction set 122 for performing operations on packed data formats. Packed instruction set 122 includes instructions for supporting intra-add and multiply operations. In addition, packed instruction set 122 may also include other packed instructions.

Execution unit 120 is coupled to register file 130 by internal bus 160. Register file 130 represents a storage area on processor 110 for storing information, including data. It is understood that the aspects of the invention are the described intra-add instruction set and a code sequence for performing matrix multiplication for operating on packed data. According to these aspects of the invention, the storage area used for storing the packed data is not critical. Execution unit 120 is coupled to cache 140 and decoder 150. Cache 140 is used to cache data and/or control signals (such as instructions) from, for example, main memory 104. Decoder 150 is used for decoding instructions received by processor 110 into control signals and/or microcode entry points. In response to these control signals and/or microcode entry points, execution unit 120 performs the appropriate operations. Decoder .150 may be implemented using any number of different mechanisms (e.g., a look-up table, a hardware implementation, a PLA, etc.).

FIG. 5 additionally shows a data storage device 108, (e.g., a magnetic disk, optical disk, and/or other machine readable media) coupled to computer system 100. In addition, the data storage device 108 is shown including code 195 for execution by the processor 110. The code 195 can be written to cause the processor 110 to perform matrix multiplication with the intra-add instruction for any number of purposes (e.g., 3-D graphics multiplication, 3-D transformation, 3-D rotation, 3-D scaling, etc.). Computer system 100 can also be coupled via bus 102 to a display device 170, a user input device 172, a hard copy device 176, a sound recording and/or playback device 178, a video digitizing device 180, and/or a communications device 190 (e.g., a serial communications chip, an ethernet chip or a modem, which provides communications with an external device or network).

DATA AND STORAGE FORMATS

Generally, a data element is an individual piece of data that is stored in a single register (or memory location) with other data elements of the same length. The number of data elements stored in a register is the number of bits supported by the packed data format (e.g., 64 bits for integer packed data) divided by the length in bits of a data element. While any number of packed data formats can be used, FIGS. 6–7, respectively, illustrate integer and floating-point packed data-types according to one embodiment of the invention.

Figure 6:
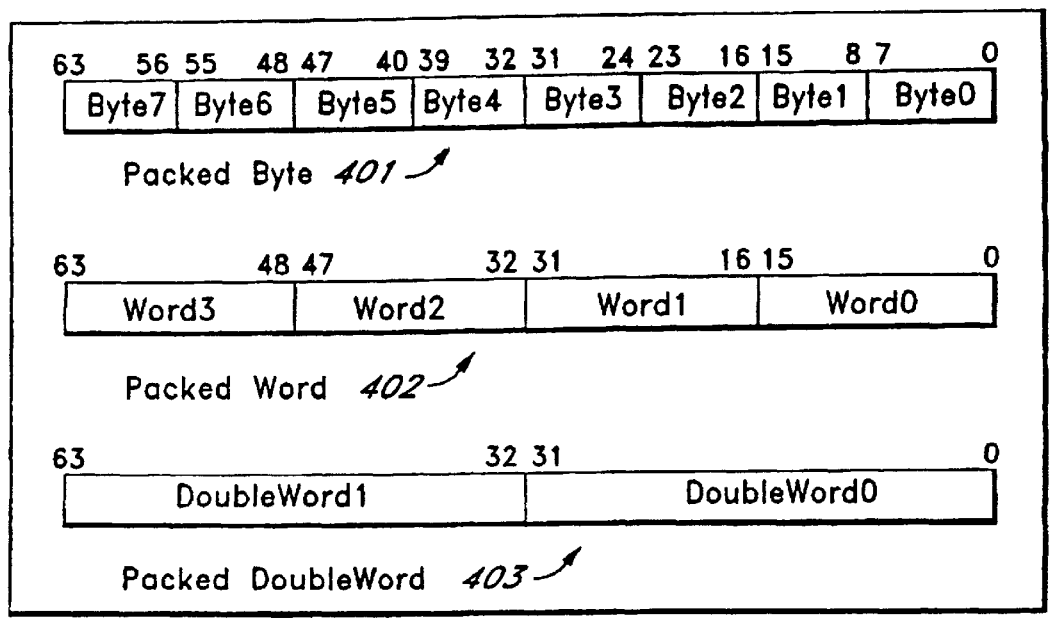
FIG. 6 illustrates packed data-types in accordance with one embodiment of the invention.

Three integer packed data formats are illustrated in FIG. 6: packed byte 401, packed word 402, and packed doubleword 403. While in one embodiment, each of the packed data formats in FIG. 6 can be either signed or unsigned formats, alternative embodiments support only signed or unsigned formats. Packed byte 401, in one embodiment of the invention, is sixty-four bits long containing eight data elements. Each data element is one byte long. Packed word 402 is sixty-four bits long and contains four word 402 data elements. Each word 402 data element contains sixteen bits of information. Packed doubleword 403 is sixty-four bits long and contains two doubleword 403 data elements. Each doubleword 403 data element contains thirty-two bits of information.

Figure 7:
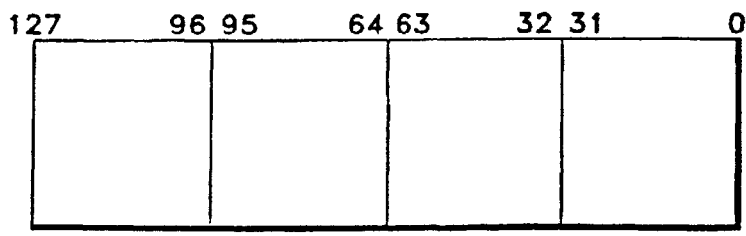
FIG. 7 illustrates one embodiment of a floating point packed data format.

FIG. 7 shows one floating point packed data format having four 32-bit data elements. While one floating point packed data format is illustrated, alternative embodiments could support a different and/or additional floating point packed data formats.

INTRA-ADD OPERATION(S)

In one embodiment of the invention, the SRC1 register contains packed data (Source1), the SRC2 register contains packed data (Source2) and the DEST register will contain the result (Result) of performing the horizontal add instruction on Source1 and Source2. In the first step of the horizontal add instruction, one or more pairs of data elements from Source1 are summed together. Similarly, one or more pairs of data elements from Source2 are summed together. The results of the instruction are then stored in the DEST register.

Figure 8:
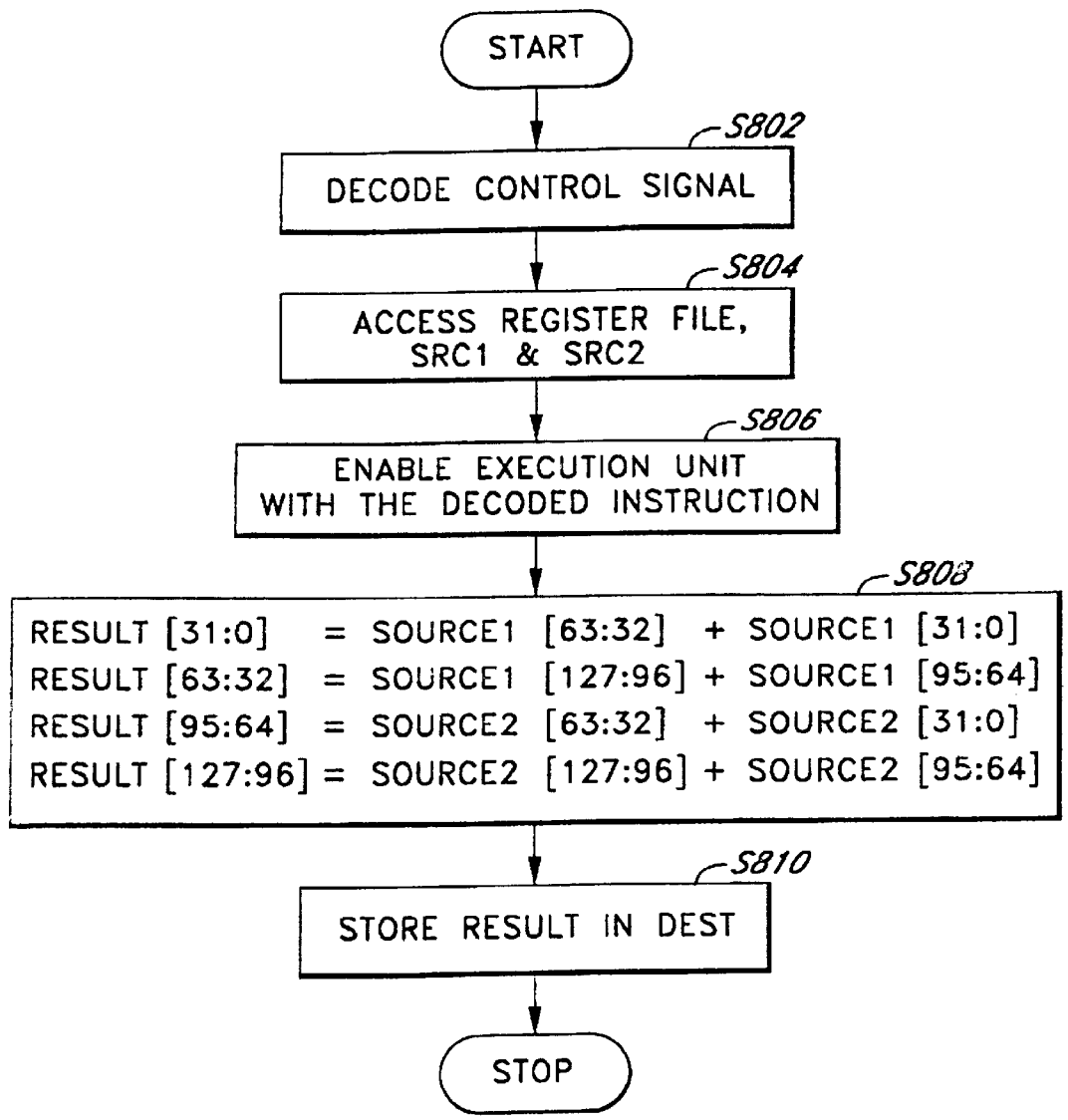
FIG. 8 is a flow diagram illustrating a method for performing the intra-add operation of FIG. 2 in accordance with one embodiment of the invention.

FIG. 8 is a flow diagram illustrating a process S800 for performing the intra-add operation of FIG. 2 according to one embodiment of the present invention. The process S800 begins from a start state and proceeds to process step S802, where the decoder 150 decodes the control signal received by processor 110. In particular, the decoder 150 decodes the operation code for the intra-add instruction.

The process S800 then advances to process step S804, where the device 150 accesses registers in register file 130 given the SRC1 602 and SRC2 603 addresses. Register file 130 provides the execution unit 120 with the packed data stored in the SRC1 602 register (Source1), and the packed data stored in SRC2 603 register (Source2).

The process S800 proceeds to process step S806, where the decoder 150 enables the execution unit 120 to perform the instruction. Next, the process S800 performs the following series of steps, as shown in process step S808 and FIG. 2. Source1 bits thirty-one through zero are added to Source1 bits sixty-three through thirty-two, generating a first 32-bit result (Result[31:0]). Source1 bits ninety-five through sixty-four are added to Source1 bits one hundred-and-twenty-seven through ninety-six, generating a second 32-bit result (Result[63:32]). Source2 bits thirty-one through zero are added to Source2 bits sixty-three through thirty-two, generating a first 32-bit result (Result[95:64]). Source2 bits ninety-five through sixty-four are added to Source1 bits one hundred-and-twenty-seven through ninety-six, generating a second 32-bit result (Result[127:96]).

The process S800 advances to process step S810, where the results of the intra-add instruction are stored in DEST. The process S800 then terminates. Of course, the method of FIG. 8 can be easily altered to describe the horizontal addition of other packed data formats.

EXEMPLARY INTRA-ADD CIRCUIT

In one embodiment, the intra-add instructions can execute on multiple data elements in the same number of clock cycles as an inter-add operation on unpacked data. To achieve execution in the same number of clock cycles, parallelism is used.

Figure 9:
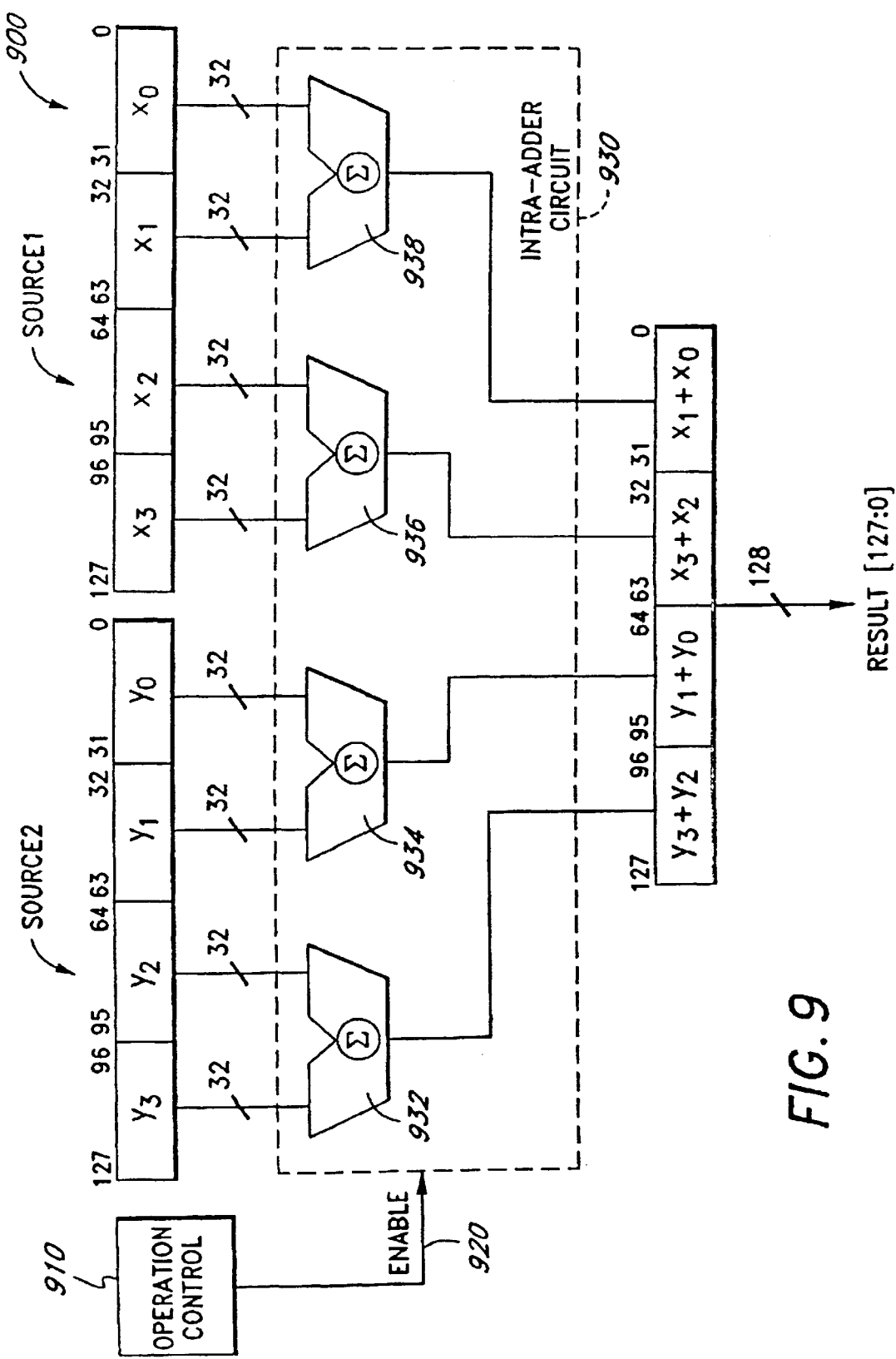
FIG. 9 illustrates a circuit for performing the intra-add operation of FIG. 2 in accordance with one embodiment of the invention.

FIG. 9 illustrates a circuit 900 for performing intra-add operation of FIG. 2 according to one embodiment of the invention. Operation control 910 processes the control signal for the intra-add operations. Operation control 910 outputs signals via signal line 920 to control intra-adder 930.

The intra-adder 930 receives inputs from Source1[127:0], Source2[127:0], and Enable 920. The intra-adder 930 includes four adder circuits 932, 934, 936 and 938. Adder 932 receives inputs from Source2[127:64], adder 934 receives inputs from Source2[63:0], adder 936 receives inputs from Source1[127:64], while adder 938 receives inputs from Source1[63:0]. When enabled, the adders 932, 934, 936 and 938 sum their respective inputs, and each generates a 32-bit output. The results of the addition by adder 932 (i.e., Result[127:96]), adder 934 (i.e., Result [95:64], by adder 936 (i.e., Result[63:32]), and by adder 938 (i.e., Result[31:0]) are combined into the 128-bit Result and communicated to the Result Register 940.

MATRIX MULTIPLICATION USING INTRA-ADD OPERATION(S)

Figure 10:
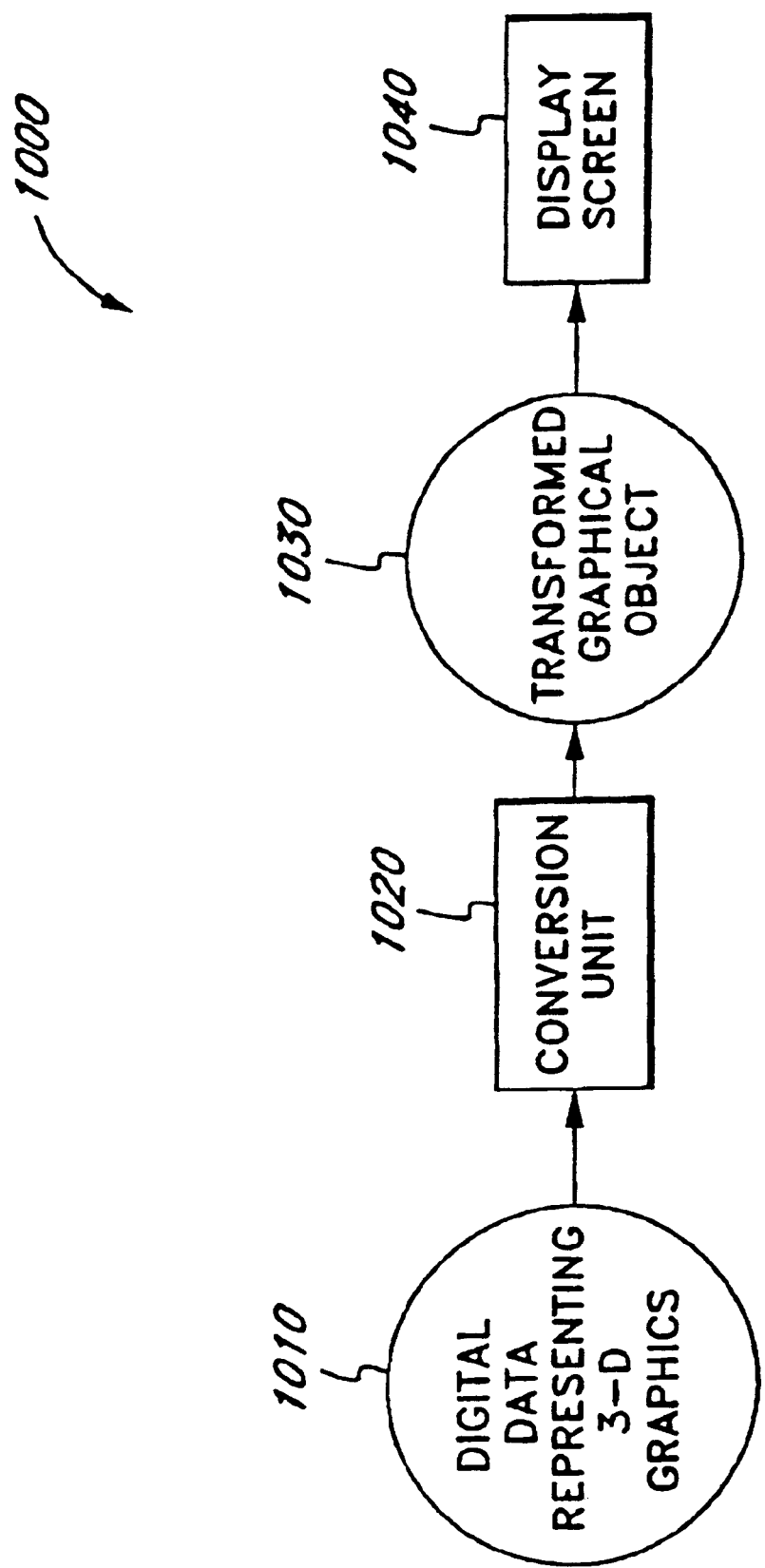
FIG. 10 is a general block diagram illustrating the use of matrix multiplication based on horizontal or inter-add operations, in rendering graphical objects in animation.

FIG. 10 is a general block diagram illustrating the use of matrix multiplication based on a horizontal or intra-add operation for rendering graphical objects in animation according to one embodiment of the invention. FIG. 10 shows a computer system 1000 containing digital data 1010 representing 3-dimensional (3D) graphics. The digital data 1010 may be read from a storage medium or generated real time. At sometime, the conversion unit 1020 alters data using 3D geometry (e.g., by performing a 3D transformation) through the implementation of matrix multiplication based on a horizontal add operation to rotate a 3D object in providing animation. The resulting graphical object 1030 (e.g., see FIGS. 4A–4G) is then displayed on a screen display 1040 using well known techniques. While FIG. 10 shows that the resulting graphical object 1030 is displayed, the resulting graphical object may alternatively be stored, transmitted, etc.

In one embodiment, the computer system 100 shown in FIG. 5 is used to implement the computer system 1000 from FIG. 10. In this embodiment, the digital data 1010 from FIG. 10 is any data stored in the storage device 110 representing 3D graphics. In one embodiment, the conversion unit 1020 from FIG. 8 is implemented using the processor 110 and the code 195 to alter data using 3D geometry. For example, data is altered to perform a transformation. In this embodiment, the processor 110, executing the code 195, performs the transformation and stores the transformed data 1030 for display.

CONCLUSION

The intra-add operation facilitates the efficient performance of multi-dimensional computations. It further increases code density by eliminating the need for the rearrangement of data elements and the corresponding rearrangement operations.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A processor comprising:

a storage area to store a first packed data operand and a second packed data operand; and an execution unit coupled to said storage area, the execution unit in response to receiving a single instruction to perform operations on data elements in said first Packed data operand and said second packed data operand to generate a plurality of data elements in a packed data result, at least two of said plurality of data elements in said packed data result being the result of an intra-add operation performed by the execution unit using one of said first packed data operand and said second packed data operand.

2. The processor of claim 1, wherein said first packed data operand and said second packed data operand each include a first pair of data elements;

one of the at least two of said plurality of data elements in said packed data result respectively represents the result of the intra-add operation performed by the execution unit adding together the first pair of data elements in the first packed data operand; and another one of the at least two of said plurality of data elements in said packed data result respectively represents the result of the intra-add operation performed by the execution unit adding together the first pair of data elements in the second packed data operand.

3. The processor of claim 2 wherein the execution unit performs a first intra-add operation on the first packed data operand and a second intra-add operation on the second packed data operand.

4. The processor of claim 1, wherein the at least two of said plurality of data elements in said first and second packed data operands and in said packed data result are floating point data.

5. The processor of claim 1, wherein said first packed data operand and said second packed data operand each include two pairs of data elements; and said packed data result has a first pair of data elements to represent the result of the execution unit summing each pair of data elements of the two pair of data elements in the first packed data operand; and said packed data result has a second pair of data elements to represent the result of the execution unit summing each pair of data elements of the two pair of data elements in the second packed data operand.

6. The processor of claim 5, wherein the pairs of data elements are floating point data.

7. The processor of claim 6, wherein each of the pair of data elements has the same number of bits.

8. The apparatus of claim 1, wherein said data elements are either unsigned or signed data.

9. The processor of claim 1 wherein operations performed by the execution unit on the data elements in said first and second packed data operands further includes one or more of the set of arithmetic operations of inter-add, inter-subtract, or inter-multiply between data elements of said first and second packed data operands.

10. The processor of claim 1 wherein operations performed by the execution unit on the data elements in said first and second packed data operands further includes one or more arithmetic operations between data elements of the set of intra-add, intra-subtract, or intra-multiply on data elements within said first packed data operand and data elements within said second packed data operand.

11. The processor of claim 1 wherein the intra-add operation performed by the execution unit on the first packed data operand or the second packed data operand is an addition operation amongst data elements within the same packed data operand.

12. A processor comprising:

a first storage area for storing a first packed data operand, containing at least an A data element and a B data element packed together;

a second storage area for storing a second packed data operand containing at least a C data element and a D data element packed together;

an add circuit responsive to execution of a single instruction the add circuit including
  a first adder coupled to said first storage area to add said A and said B data elements together generating an output result in response to execution of a single instruction, and
  a second adder coupled to said second storage area to add said C and said D data elements together generating an output result in response to the single instruction; and a third storage area coupled to said first and said second adders, said third storage area having at least a first field and a second field, said first field for storing the output result of said first adder as a first data element of a third packed data, said second field for storing the output result of said second adder as a third data element of said third packed data.

13. The processor of claim 12, wherein said first packed data operand further contains an E data element and an F data element;

said second packed data operand further contains a G data element and an H data element;

said add circuit further including
  a third adder coupled to said first storage area to add said E and said F data elements to generate an output result, and
  a fourth adder coupled to said second storage area to add said G and said H data elements to generate an output result; and said third storage area further coupled to said third and said fourth adders, said third storage area further having a third field and a fourth field, said third field for storing the output result of the third adder as a second data element of said third packed data, said fourth field for storing the output result of the fourth adder as a fourth data element of said third packed data.

14. The processor of claim 13, wherein said A, B, C, D, E, F, G and H data elements are either signed or unsigned data.

15. The processor of claim 13, wherein to add said A and B data elements together is a first intra-add operation, to add said C and D data elements together is a second intra-add operation, to add said E and F data elements together is a third intra-add operation, and to add said G and H data elements together is a fourth intra-add operation.

16. The processor of claim 12, wherein the data elements are floating point data.

17. The processor of claim 12, wherein each data element has the same number of bits.

18. The processor of claim 12, wherein said data elements are either unsigned or signed data.

19. The processor of claim 12, wherein to add said A and B data elements together is a first intra-add operation, and to add said C and D data elements together is a second intra-add operation.

20. A processor comprising:

a decoder configured to decode instructions, and a circuit coupled to said decoder, said circuit in response to a single decoded instruction being configured to:
add together data elements in a first packed data operand to generate a first result data element;
add together data elements in a second packed data operand to generate a second result data element; and
store said first and second result data elements in a register for use as a packed data operand.

21. The processor of claim 20, wherein said data elements in said first packed data operand, said second packed data operand and said packed data operand are floating point data.

22. The processor of claim 20, wherein each data element has the same number of bits.

23. The processor of claim 20 further comprising:

a first source register to store said first packed data operand, and a second source register to store said second packed data operand.

24. The processor of claim 20, wherein to add data elements together in the first packed data operand is a first intra-add operation, and to add data elements together in the second packed data operand is a second intra-add operation.

25. A method of single instruction execution in a computer, the method comprising:

a) decoding a single instruction;

b) in response to said decoding of the single instruction, adding a first value and a second value of a first packed data operand together to generate a first data element; and c) completing execution of said single instruction by storing said first data element in a first field of a storage area.

26. The method of claim 25, further comprising:

adding a third value and a fourth value of the first packed data operand together to generate a second data element, and completing execution of said single instruction by storing said second data element in a second field of the storage area.

27. The method of claim 26, wherein the adding together of the first value and the second value of the first packed data operand is a first intra-add operation, and the adding together of the third value and the fourth value of the first packed data operand is a second intra-add operation.

28. The method of claim 25, further comprising:

prior to adding the first value and the second value of the first packed data operand together, storing the first packed data operand in the storage area.

29. The method of claim 25, wherein the adding together of the first value and the second value of the first packed data operand is a first intra-add operation.

30. A method for manipulating a first packed data and a second packed data in a computer system, the first packed data having an A data element and a B data element adjacent to the A data element, the second packed data having a C data element and a D data element adjacent to the C data element, the method comprising a) decoding a single instruction;

b) in response to said decoding of said single instruction,
performing the operation of (A+B) to generate a first data element in a third packed data, and
performing the operation of (C+D) to generate a second data element in the third packed data; and c) storing said third packed data in a storage area.

31. The method of claim 30, further comprising:

prior to performing the operation of (A+B) and the operation of (C+D), storing the first packed data into the storage area, and storing the second packed data into the storage area.

32. The method of claim 30, wherein the performance of the operation of (A+B) is a first intra-add operation, and the performance of the operation of (C+D) is a second intra-add operation.

33. The method of claim 30, wherein the first packed data further has an E data element and an F data element adjacent the E data element, the second packed data further has a G data element and an H data element adjacent the G data element, and in response to said decoding of said single instruction, prior to said storing of said third packed data in the storage area, the method further includes
performing the operation of (E+F) to generate a third data element in the third packed data, and
performing the operation of (G+H) to generate a fourth data element in the third packed data.

34. The method of claim 33, further comprising:

prior to performing the operations, storing the first packed data into the storage area, and storing the second packed data into the storage area.

35. The method of claim 33, wherein the performance of the operation of (A+B) is a first intra-add operation, the performance of the operation of (C+D) is a second intra-add operation, the performance of the operation of (E+F) is a third intra-add operation, and the performance of the operation of (G+H) is a fourth intra-add operation.

36. A method of executing a single instruction in a computer, said method comprising:

summing a pair of data elements within a first packed data operand of said single instruction;

summing a pair of data elements within a second packed data operand of said single instruction; and storing the summed pairs as separate data elements in a result packed data operand for use by another instruction.

37. The method of claim 36, wherein said data elements are floating point data.

38. The method of claim 36, further comprising:
prior to summing the pair of data elements in the first packed data operand and the second packed data operand,
storing the first packed data operand into a first register, and
storing the second packed data into a second register.

39. The method of claim 36, wherein
the summing of the pair of data elements within the first packed data operand is a first intra-add operation, and
the summing of the pair of data elements within the second packed data operand is a second intra-add operation.

40. A method for matrix multiplication in a processor, the method comprising:
responsive to the processor receiving a single instruction,
multiplying each data element of a first row of a matrix source to each respective data element of a vector source to generate a plurality of data elements of a first intermediate result,
multiplying each data element of a second row of the matrix source to each respective data element of the vector source to generate a plurality of data elements of a second intermediate result,
performing an intra-addition operation on the plurality of data elements of the first intermediate result to generate a first data element of a packed result, and
performing an intra-addition operation on the plurality of data elements of the second intermediate result to generate a second data element of the packed result.

41. The method of claim 40 wherein the matrix source is a two by two matrix and the vector source is a two by one matrix and the packed result is a two by one matrix.

42. The method of claim 40 wherein
the intra-addition operation of the first intermediate result are horizontal addition operations amongst the plurality of data elements in the first intermediate result, and
the intra-addition operation of the second intermediate result are horizontal addition operations amongst the plurality of data elements in the second intermediate result.

43. The method of claim 40 wherein
the first intermediate result is a packed data operand having the plurality of data elements, and
the second intermediate result is a packed data operand having the plurality of data elements.

44. A method for matrix multiplication in a processor, the method comprising:
responsive to the processor receiving a single instruction,
multiplying each data element of a first row of a matrix source to each respective data element of a vector source to generate a plurality of data elements of a first intermediate result,
multiplying each data element of a second row of the matrix source to each respective data element of the vector source to generate a plurality of data elements of a second intermediate result,
multiplying each data element of a third row of the matrix source to each respective data element of the vector source to generate a plurality of data elements of a third intermediate result,
multiplying each data element of a fourth row of the matrix source to each respective data element of the vector source to generate a plurality of data elements of a fourth intermediate result,
performing an intra-addition operation on the plurality of data elements of the first intermediate, result to generate first and second data elements of a first intra-add result,
performing an intra-addition operation on the plurality of data elements of the second intermediate result to generate third and fourth data elements of the first intra-add result,
performing an intra-addition operation on the plurality of data elements of the third intermediate result to generate first and second data elements of a second intra-add result,
performing an intra-addition operation on the plurality of data elements of the fourth intermediate result to generate third and fourth data elements of the second intra-add result,
performing an intra-addition operation on data elements of the first intra-add result to generate first and second data elements of a packed output result, and
performing an intra-addition operation on data elements of the second intra-add result to generate third and fourth data elements of the packed output result.

45. The method of claim 44 wherein the matrix source is a four by four matrix and the vector source is a four by one matrix and the packed output result is a four by one matrix.

46. The method of claim 44 wherein
the intra-addition operation of the first intermediate result are horizontal addition operations amongst the plurality of data elements in the first intermediate result,
the intra-addition operation of the second intermediate result are horizontal addition operations amongst the plurality of data elements in the second intermediate result,
the intra-addition operation of the third intermediate result are horizontal addition operations amongst the plurality of data elements in the third intermediate result, and
the intra-addition operation of the fourth intermediate result are horizontal addition operations amongst the plurality of data elements in the fourth intermediate result.

47. The method of claim 44 wherein
the first intermediate result is a packed data operand having the plurality of data elements,
the second intermediate result is a packed data operand having the plurality of data elements,
the third intermediate result is a packed data operand having the plurality of data elements, and
the fourth intermediate result is a packed data operand having the plurality of data elements.

48. A method in a processor for executing an intra-add operation using operands, the method comprising:
responsive to the processor receiving a single intra-add instruction and a first and second operand, each of the first and second operand being a packed data type and having a plurality of data elements of an even number, the even number of the plurality of data elements forming pairs of data elements from one end to another end of each operand,
for the first operand, summing the data elements of each pair of data elements together to generate lower order data elements of a resultant, and
for the second operand, summing the data elements of each pair of data elements together to generate higher order data elements of the resultant, the resultant having a plurality of data elements of the even number.

49. The method of claim 48, wherein each of the data elements represent floating point data.

50. The method of claim 48, wherein each of the data elements has the same number of bits.

51. The method of claim 48, wherein each of the data elements represents unsigned or signed data.

52. A processor responsive to a single instruction having a first packed data operand, the processor comprising:

means for decoding the single instruction;

means for summing a pair of data elements within the first packed data operand of the single instruction in response thereto; and means for storing the summed pair as a separate data element in a packed result operand for use by another instruction.

53. The processor of claim 52 further comprising:

means for performing one or more operations of the set of arithmetic operations of inter-add, inter-subtract, or inter-multiply between respective data elements of the first packed data operand and a second packed data operand.

54. The processor of claim 52 further comprising:

means for performing one or more operations of the set of arithmetic operations between data elements of the set of intra-add, intra-subtract, or intra-multiply on data elements within the first packed data operand and data elements within a second packed data operand.

55. The processor of claim 52, further comprising:

a storage means to store the first packed data operand.

56. The processor of claim 52 wherein, the means for summing the pair of data elements within the first packed data operand is a means to intra-add.

57. A processor comprising:

a storage area to store a first packed data operand having data elements; and an execution unit coupled to the storage area, the execution unit in response to receiving a single instruction to perform operations on the data elements in the first packed data operand to generate a plurality of data elements in a packed data result, at least one of the plurality of data elements in the packed data result being the result of an intra-add operation performed by the execution unit using at least two of the data elements in the first packed data operand.

58. The processor of claim 57, wherein the storage area to store a second packed data operand having data elements; and the execution unit in response to receiving the single instruction to perform operations on the data elements in the second packed data operand to generate a plurality of data elements in the packed data result, at least another one of the plurality of data elements in the packed data result being the result of an intra-add operation performed by the execution unit using at least two of the data elements in the second packed data operand.

* * * * *